United States Patent
Bae et al.

(10) Patent No.: US 8,959,557 B2
(45) Date of Patent: Feb. 17, 2015

(54) MOBILE TERMINAL, DISPLAY DEVICE AND CONTROLLING METHOD THEREOF

(75) Inventors: Jisoo Bae, Gwangmyeong-si (KR); Jaephil Ki, Seoul (KR)

(73) Assignee: LG Electronics Inc., Seoul (KR)

( * ) Notice: Subject to any disclaimer, the term of this patent is extended or adjusted under 35 U.S.C. 154(b) by 555 days.

(21) Appl. No.: 13/180,038

(22) Filed: Jul. 11, 2011

(65) Prior Publication Data

US 2012/0110625 A1 May 3, 2012

(30) Foreign Application Priority Data

Oct. 29, 2010 (KR) .......... 10-2010-0106971

(51) Int. Cl.
| | |
|---|---|
| H04N 7/173 | (2011.01) |
| H04N 21/414 | (2011.01) |
| H04N 21/41 | (2011.01) |
| H04N 21/436 | (2011.01) |
| H04N 21/4363 | (2011.01) |
| H04N 21/472 | (2011.01) |

(52) U.S. Cl.
CPC ..... *H04N 21/41407* (2013.01); *H04N 21/4122* (2013.01); *H04N 21/43615* (2013.01); *H04N 21/43637* (2013.01); *H04N 21/47214* (2013.01)
USPC ......................................................... 725/86

(58) Field of Classification Search
CPC .......... H04N 21/2343; H04N 21/2355; H04N 21/26258; H04N 21/4402; H04N 21/472; H04N 21/4122; H04N 21/4126; H04N 21/4222; H04N 21/440263; H04N 21/41407
USPC ............ 725/28, 32, 60, 86, 92, 94, 114, 115, 725/62, 37, 109, 116, 112, 42; 701/202; 340/10.1; 370/252; 455/434; 381/331; 710/5
See application file for complete search history.

(56) References Cited

U.S. PATENT DOCUMENTS

| | | | |
|---|---|---|---|
| 6,859,845 B2 * | 2/2005 | Mate | 710/5 |
| 2006/0174304 A1 * | 8/2006 | Kim et al. | 725/116 |
| 2007/0237090 A1 * | 10/2007 | Kim et al. | 370/252 |
| 2008/0025535 A1 * | 1/2008 | Rajapakse | 381/311 |
| 2008/0030304 A1 * | 2/2008 | Doan et al. | 340/10.1 |
| 2009/0143067 A1 * | 6/2009 | Kim et al. | 455/434 |
| 2009/0177376 A1 * | 7/2009 | Mo et al. | 701/202 |

* cited by examiner

*Primary Examiner* — Nasser Goodarzi
*Assistant Examiner* — An Nguyen
(74) *Attorney, Agent, or Firm* — Birch, Stewart, Kolasch & Birch, LLP

(57) ABSTRACT

A device and method for playing desired multimedia content when a mobile terminal (DMC) gives a command for a display device (DMR) to play a desired multimedia content in a home network service, in case that the display device is already playing a different multimedia content. The method includes searching for one or more multimedia contents, selecting one of the found multimedia contents via a user input unit, searching for at least one or more external display devices via a wireless communication unit, selecting a first display device from the found external display devices via the user input unit, and determining whether the selected multimedia content is to be played by the first display device in accordance with an ongoing or reserved job schedule of the first display device.

23 Claims, 15 Drawing Sheets

MOBILE TERMINAL, DISPLAY DEVICE AND CONTROLLING METHOD THEREOF

CROSS REFERENCE TO RELATED APPLICATIONS

Pursuant to 35 U.S.C. §119(a), this application claims the benefit of earlier filing date and right of priority to Korean Application No. 10-2010-0106971, filed on Oct. 29, 2010, the contents of which are hereby incorporated by reference herein in their entirety.

BACKGROUND OF THE INVENTION

1. Field of the Invention

The present invention relates to a mobile terminal, and more particularly, to a mobile terminal, display device and controlling method thereof. Although the present invention is suitable for a wide scope of applications, it is particularly suitable for facilitating the mobile terminal and the display device to be used in further consideration of user's convenience.

2. Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

For instance, a user is able to freely enjoy a desired multimedia content via mutual data communications between home devices in such a home network service as DLNA (digital living network alliance) network and the like. And, the mobile terminal is usable as a digital multimedia controller (DMC) in the home network service.

The mobile terminal playing a role as the DMC in the home network service is able to perform mutual data communications by being connected to such a display device playing a role as a digital multimedia renderer (DMR) as a notebook computer, a tablet computer, a personal computer, a television set and the like by wire/wireless. And, a user is able to give a command for playing a desired multimedia content stored in a digital multimedia server (DMS) in the display device using the mobile terminal.

However, while the conventional display device is already playing a specific multimedia content, a command for playing a new multimedia content is given to the conventional display device, which may unexpectedly cause interruption to the playing of the specific multimedia content. Therefore, a method of processing the command for playing the desired multimedia content needs to be researched and developed in further consideration of user's convenience.

SUMMARY OF THE INVENTION

Accordingly, the present invention is directed to a mobile terminal, display device and controlling method thereof that substantially obviate one or more problems due to limitations and disadvantages of the related art.

An object of the present invention is to provide a mobile terminal, display device and controlling method thereof. In particular, when a mobile terminal (DMC) gives a command for a display device (DMR) to play a desired multimedia content in a home network service, in case that the display device is already playing a different multimedia content, the play command for the desired multimedia content can be processed in further consideration of user's convenience.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a user input unit, a wireless communication unit, and a controller configured to search for at least one or more multimedia contents and then control one of the found multimedia contents to be selected via the user input unit, search for at least one or more external display devices via the wireless communication unit and then control a first display device to be selected from the found external display devices via the user input unit, and determine whether the selected multimedia content is to be played by the first display device in accordance with an ongoing or reserved job schedule of the first display device.

In another aspect of the present invention, a display device according to the present invention includes a display unit, an interface unit, and a controller configured to receive multimedia contents selected by at least one or more control devices via the interface unit, display the received multimedia contents on the display unit, and upon receiving a control command for playing a specific multimedia content from a first control device among the at least one or more control devices via the interface unit, determine whether to play the specific multimedia content in accordance with an ongoing or reserved job schedule.

In another aspect of the present invention, a method of controlling a mobile terminal includes searching for at least one or more multimedia contents, selecting one of the found multimedia contents via a user input unit, searching for at least one or more external display devices via a wireless communication unit, selecting a first display device from the found external display devices via the user input unit, and determining whether the selected multimedia content is to be played by the first display device in accordance with an ongoing or reserved job schedule of the first display device.

In a further aspect of the present invention, a method of controlling a display device includes receiving multimedia contents selected by at least one or more control devices via a interface unit, displaying the received multimedia contents on a display unit, and if receiving a control command for playing a specific multimedia content from a first control device among the at least one or more control devices via the interface unit, determining whether to play the specific multimedia content in accordance with an ongoing or reserved job schedule.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

In the following description, a home network for implementing one embodiment of the present invention is schematically explained with reference to FIG. 1.

Figure 1:
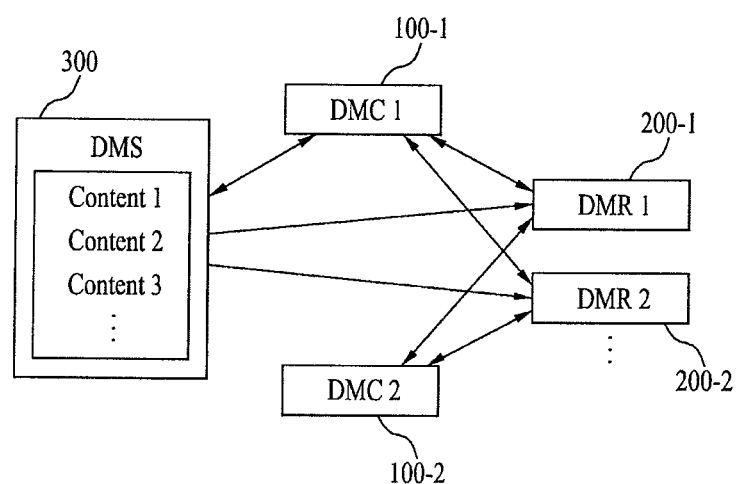
FIG. 1 is a schematic diagram for a configuration of a home network for implementing one embodiment of the present invention.

FIG. 1 is a schematic diagram for a configuration of a home network for implementing one embodiment of the present invention.

First of all, in the present specification, assume that the home network includes a DLNA (digital living network appliance) network. Yet, it is apparent to those skilled in the art that the present invention is non-limited by the DLNA network.

The DLNA network can mainly include entities such as at least one digital multimedia controller (DMC), at least one digital multimedia renderer (DMR) and at least one digital multimedia server (DMS). FIG. 1 exemplarily shows that the DLNA network includes two DMCs (i.e., DMC 1 100-1 and DMC 2 100-2), two DMRs (i.e., DMR 1 2001- and DMR 2 200-2) and a DMS 300, by which the embodiment of the present invention is non-limited.

The DMC selects a desired multimedia content from the DMS and also selects a DMR to play the selected multimedia content. The DMC is then able to control the selected multimedia content to be played by the selected DMR. That is, the DMC may control the DMS and the DMC to play the selected multimedia stored in the DMS in the DMR.

Specifically, the DMS stores various kinds of multimedia contents and is able to transmit the selected multimedia content to the selected DMR under the control of the DMC. The DMS may be implemented with a personal computer (e.g., a notebook computer, a desktop computer, etc.) or a server for example. In this case, the DMS may exist as an individual entity separate from the DMC. Alternatively, the DMS may be included in the DMC, whereby the DMS and the DMC can be implemented as a single entity.

The DMR may receive the selected multimedia content from the DMS not via the DMC and is then able to play the received multimedia content, under the control of the DMC.

In aspect of the DMC, the DMR can be understood as an external display device. In aspect of the DMR, the DMC can be understood as an external control device.

The DMC, the DMR and the DMS can be connected together via a wired internet network (e.g., IEEE 802.14), a wireless internet network (e.g., IEEE 802.11) or a shirt-range communication network (e.g., Bluetooth).

In the following description, a mobile terminal capable of playing a role as the DMC and a display device capable of playing a role as the DMR among the entities of the DLNA network are explained in detail.

First of all, a mobile terminal according to the present invention is described as follows.

The present invention can be applicable to a various types of mobile terminals. Examples of such terminals include mobile phones, user equipments, smart phones, digital broadcast receivers, personal digital assistants, portable multimedia players (PMP), navigators and the like.

Figure 2:
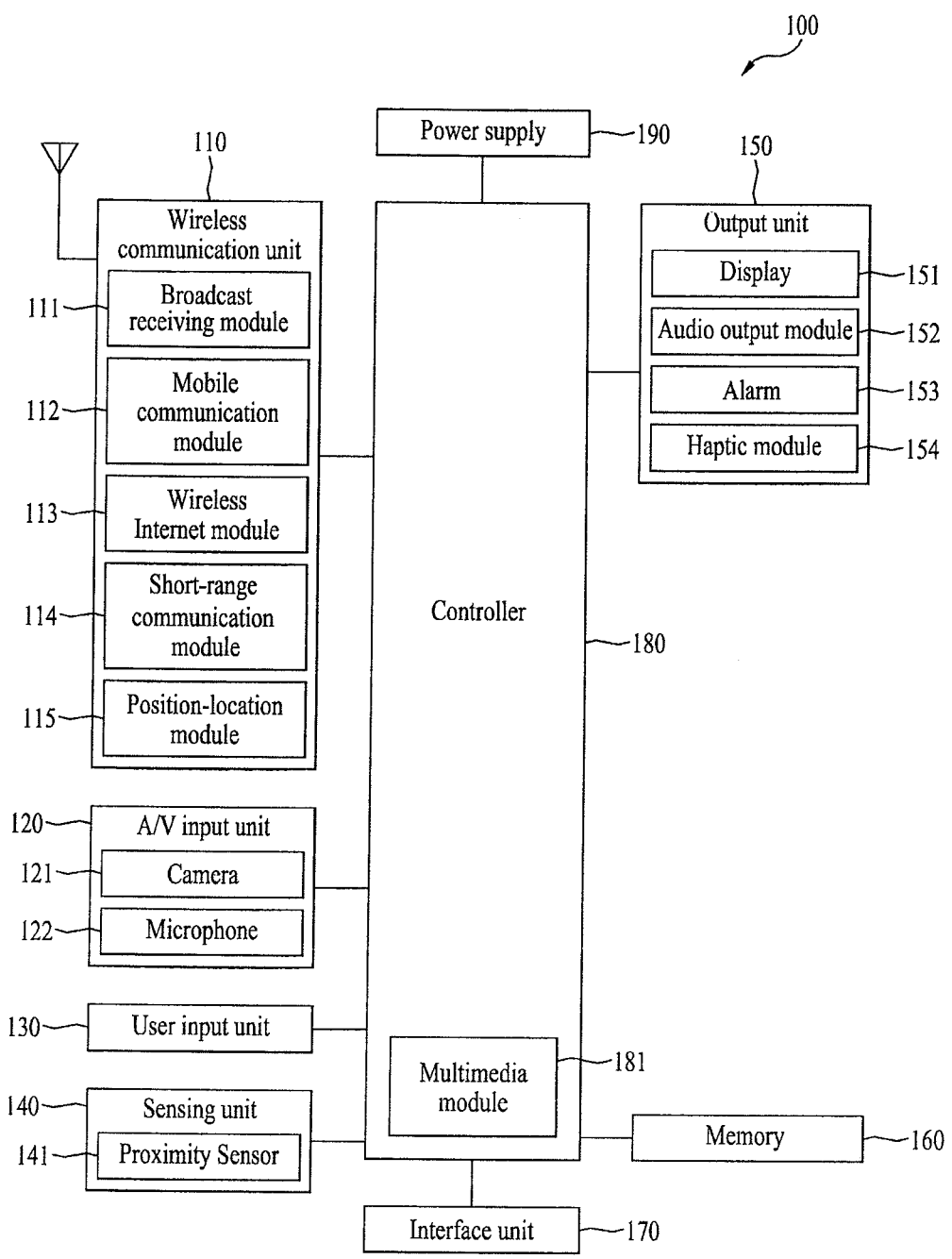
FIG. 2 is a block diagram of a mobile terminal according to one embodiment of the present invention.

FIG. 2 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. The broadcast associated information can be provided via a mobile communication network. In this case, the broadcast associated information can be received by the mobile communication module 112.

The mobile communication module 112 transmits/receives wireless signals to/from one or more network entities (e.g., base station, external terminal, server, etc.) via a mobile communication network such as (but not limited to) GSM (Global System for Mobile communications), CDMA (Code Division Multiple Access), and WCDMA (Wideband CDMA). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include (but not limited to) WLAN (Wireless LAN) (Wi-Fi), Wibro (Wireless broadband), Wimax (World Interoperability for Microwave Access), HSDPA (High Speed Downlink Packet Access) GSM, CDMA, WCDMA, LTE (Long Term Evolution), etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module. According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

Referring to FIG. 2, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. For example, the sensing unit includes at least one of a gyroscope sensor, acceleration sensor, a geomagnetic sensor and the like. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 2, a proximity sensor (141) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

Considering that the wireless internet module 113 and the short-range communication module 114 are usable as the wireless data ports, each of the wireless internet module 113 and the short-range communication module 114 can be understood as a sort of the interface unit 170.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectable to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

In the above description, so far, the mobile terminal according to the present invention is described. In the following description, a display device according to the present invention is explained.

First of all, no limitation is put on a display device described in this disclosure if the display device is able to receive and display information on a display of the mobile terminal by being connected to the mobile terminal for communications in-between. For example, the display device can include one of a notebook computer (laptop), a tablet computer, a desktop computer, a television set (e.g., a digital TV set, a smart TV set, etc.) and the like.

Figure 3:
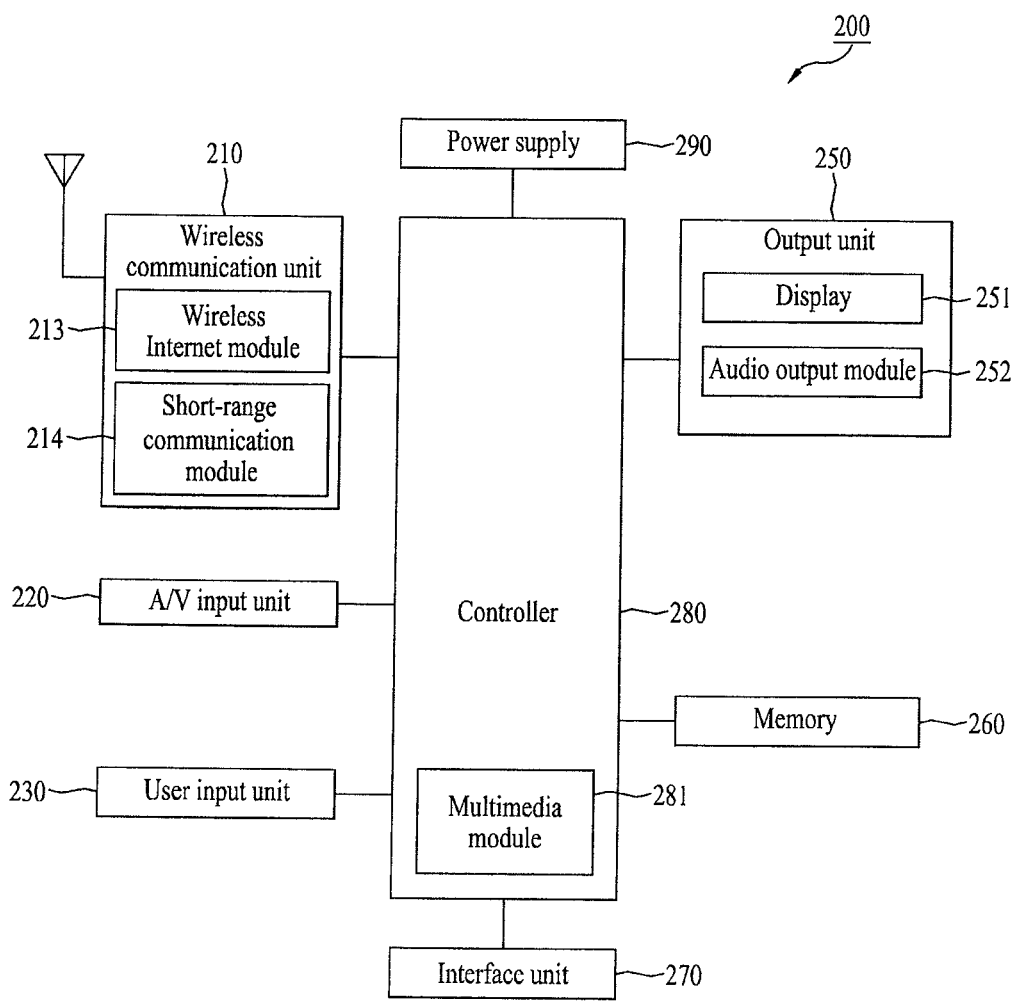
FIG. 3 is a block diagram of a display device according to an embodiment of the present invention.

FIG. 3 is a block diagram of a display device according to one embodiment of the present invention.

Referring to FIG. 3, a display device 200 according to one embodiment of the present invention includes a wireless communication unit 210, an A/V (audio/video) input unit 220, a user input unit 230, an output unit 250, a memory 260, an interface unit 270, a controller 280, a power supply unit 290 and the like.

The wireless communication unit 210 can include a wireless internet module 213 and a short-range communication module 214. The output unit 250 can include a display unit 251 and an audio output module 252.

Since the components of the display device 200 are identical or similar to the corresponding components of the above-described mobile terminal, their details shall be omitted from the following description for clarity of this disclosure.

Since the components shown in FIG. 3 are not entirely mandatory, more or less components can be implemented for the display device. For instance, in case that the display device 200 is a television, it can further include a broadcast receiving module. Moreover, in case that the display device 200 is the television, it may not be provided with the wireless internet module. Of course, the display device 200 can include the wireless internet module. Since the broadcast receiving module is identical or mostly similar to the former broadcast receiving module 111 of the mobile terminal 100 described with reference to FIG. 2, its detail shall be omitted from the following description for clarity of this disclosure.

In the following description, a process for playing a specific multimedia content through data communications among the DMC, the DMR and the DMS in the aforesaid home network according an embodiment of the present invention is explained with reference to FIGS. 4 to 6.

In the description of the following embodiment, assume that the display module 151 of the mobile terminal 100 as the DMC and the display module 251 of the display device 200 as the DMR include touchscreens, respectively. Yet, it is apparent to those skilled in the art that the display modules 151 and 251 are non-limited by the touchscreens. In the following description, a display screen of the mobile terminal 100 shall be indicated by a reference number '400' and a display screen of the display device 200 shall be indicated by a reference number '500'.

Figure 4:
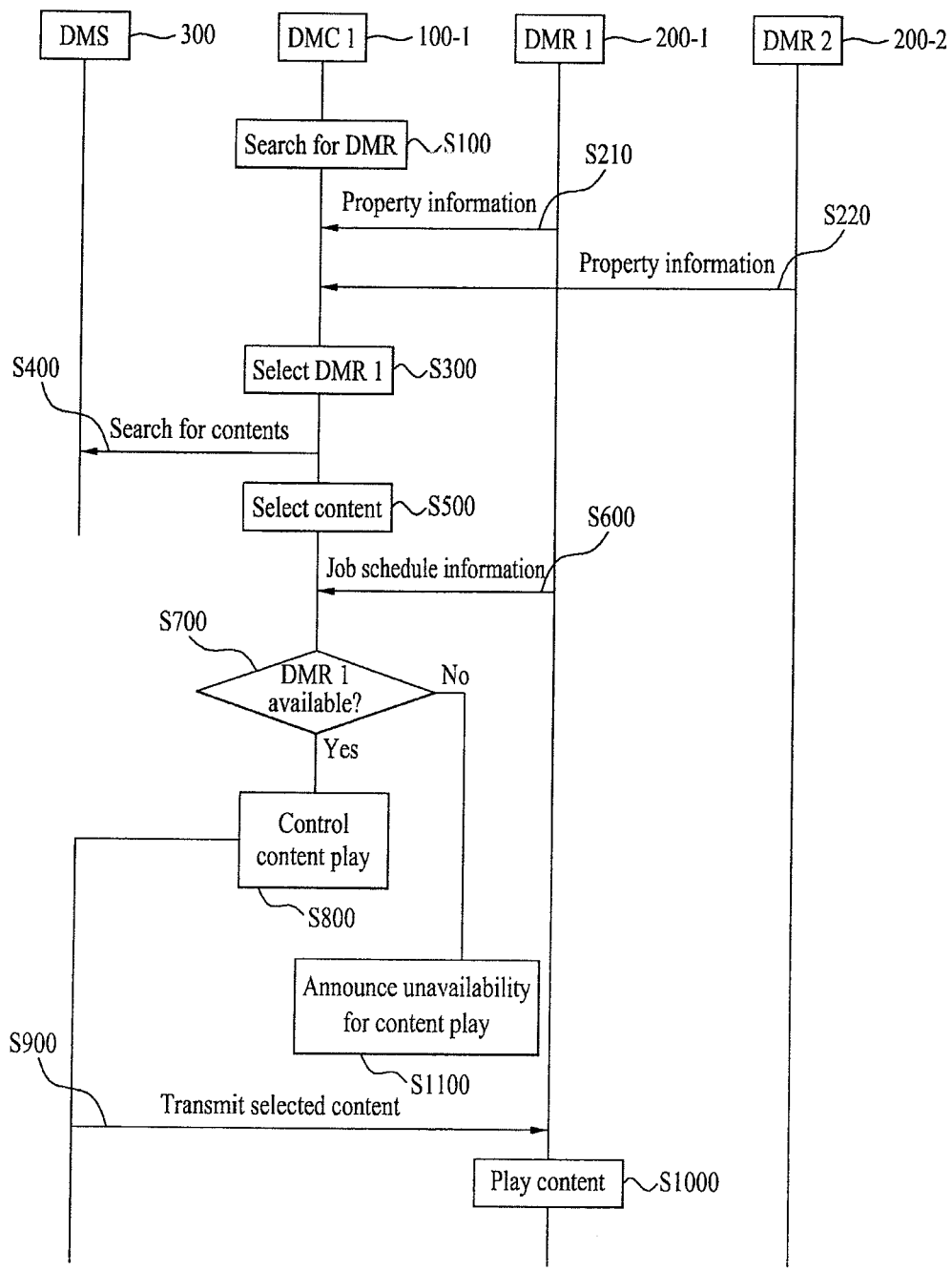
FIG. 4 is a flowchart for implementing an embodiment according to an embodiment of the present invention.

FIG. 4 is a flowchart for implementing an embodiment according to the present invention. FIG. 5 is a diagram of display screen configuration of a display unit of a DMC according to an embodiment of the present invention. And, FIG. 6 is a diagram of display screen configuration of a display unit of a DMR according to an embodiment of the present invention.

Figure 5:
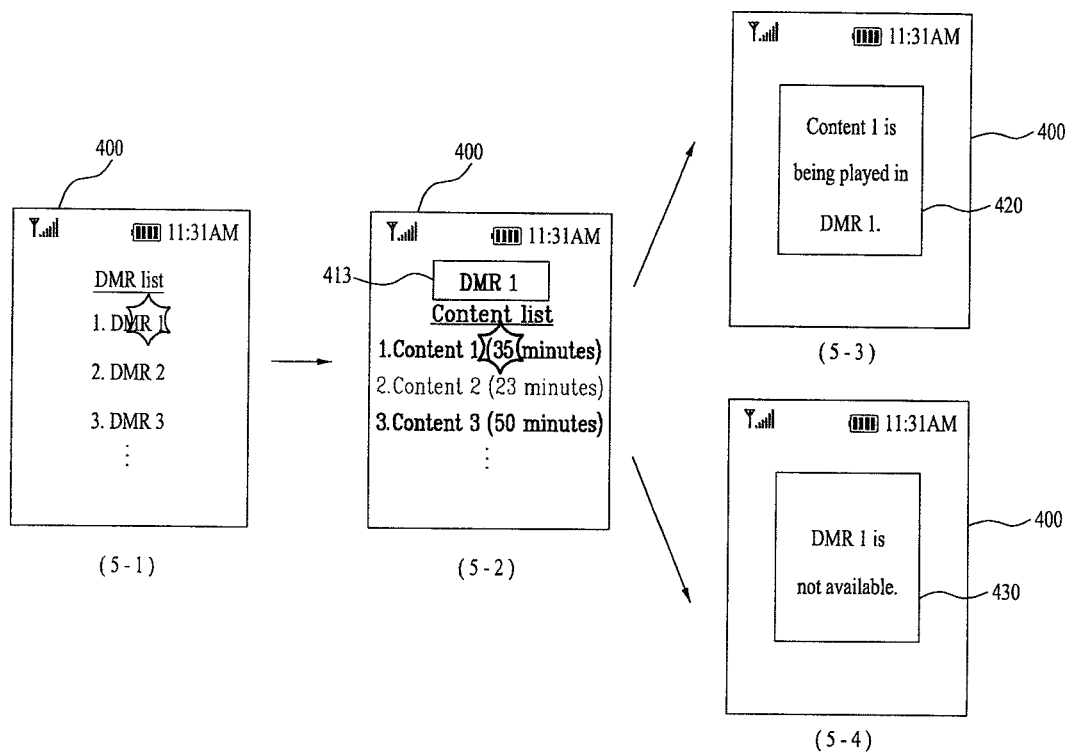
FIG. 5 is a diagram of display screen configuration of a display unit of a DMC according to an embodiment of the present invention.
Figure 6:
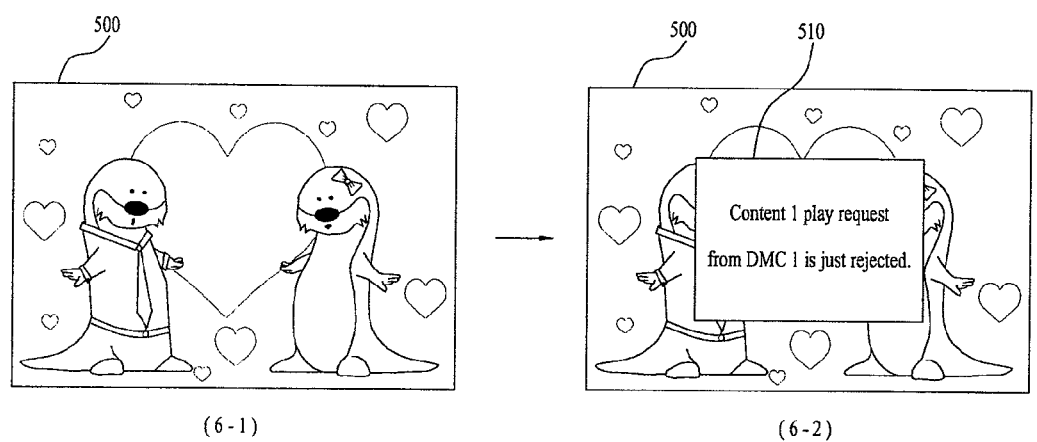
FIG. 6 is a diagram of display screen configuration of a display unit of a DMR according to an embodiment of the present invention.

Referring to FIGS. 4 to 6, the DMC 1 100-1 is able to search for the DMRs (i.e., DMR 1, DMR 2 . . . ) within the home network [S100]. After the DMC 1 100-1 has accessed a prescribed home network, when a prescribed user command is inputted via the user input unit 130 of the DMC 100-1, the search by the DMC 1 100-1 can be performed. Alternatively, when the DMC 1 100-1 accesses the home network, the search by the DMC 1 100-1 can be automatically performed. Alternatively, if it is determined that the DMC 1 100-1 is situated within a specific area via the position location module 115, the search by the DMC 1 100-1 can be automatically performed.

The DMC 1 100-1 is able to receive property information from each of the DMRs found from the home network [S210, S220]. In this case, the property information may be related to a multimedia play property of each of the corresponding DMRs, so that it may include content format information on a content format playable by the corresponding DMR, display resolution information and the like, by which the present embodiment is non-limited.

The controller 180 of the DMC 1 100-1, as shown in FIG. 5 (5-1), is able to display a DMR list of the found DMRs.

A user is able to select one of the DMRS (e.g., the DMR 1 200-1) from the DMR list [S300]. In this case, the selection of the DMR 1 can be performed in a manner of touching the DMR 1 on the display screen 400, on which the DMR list is displayed, of the DMC 1 100-1. Alternatively, it is a matter of course that the DMR 1 can be selected through an appropriate manipulation of the user input unit 130.

If the DMR 1 200-1 is selected from the DMR list, the controller 180 of the DMC 1 100-1 may access the DMS 300 and is then able to search for multimedia contents that can be provided by the DMS 300.

Subsequently, referring to FIG. 5 (5-2), the controller 180 of the DMC 1 100-1 is able to display a content list of the found multimedia contents. When the content list is displayed, it is able to display an indicator 413 indicating that the DMR 1 has been already selected as well.

The controller 180 of the DMC 1 100-1 may search for all multimedia contents of the DMS 300 and is then able to display all of the found multimedia contents on the content list.

In doing so, referring to FIG. 5 (5-2), the controller 180 of the DMC 1 100-1 is able to display the multimedia contents corresponding to the specific information (e.g. the content format information) of the selected DMR 1 200-1 among the entire multimedia contents of the DMS 300 on the content list in a manner that the multimedia contents (e.g., content 1 and content 3) playable by the selected DMR 1 200-1 are visually distinguished from the multimedia contents (e.g., content 2) that are not playable by the selected DMR 1 200-1.

Optionally, the multimedia contents playable by the selected DMR 1 200-1 only can be displayed on the content list [not shown in the drawings].

The user is able to select a multimedia content (e.g., content 1) from the content list [S500]. In this case, the selection of the content 1 can be performed in a manner of touching the content 1 on the display screen 400, on which the content list is displayed, of the DMC 1 100-1. Of course, it is able to select the content 1 through an appropriate manipulation of the user input unit 130 of the DMC 1 100-1.

Besides, it is not mandatory for the controller 180 of the DMC 1 100-1 to receive the property information on the DMRs. In particular, the step S210 and the step S220 are omittable. In case that the step S210 and the step S220 are omitted, the controller 180 of the DMC 1 100-1 is able to search the multimedia contents of the DMS 300 without considering the property information of the selected DMR. In this case, the step S400 and the step 500 can be performed before or in the course of executions of the steps S100 to 300.

The DMC 1 100-1 is able to receive job schedule information from the selected DMR 1 200-1 [S600]. In this case, the job schedule means the scheme of currently ongoing or reserved job(s). In particular, the job is able to include a multimedia content playback controlled and played by the DMC(s) as well as a multimedia playback (e.g., broadcast reception and play) performed by the DMR 1 itself irrespective of the DMC(s).

The job schedule information can include information on a currently ongoing or reserved multimedia content, information on an entity (DMC) controlling a playback of the currently ongoing or reserved multimedia content, a job estimated time (or a job remaining time) and the like.

Optionally, the step S600 of receiving the job schedule information can be performed after the step S300 of selecting the DMR 1 and before the step S500 for the content selection.

The controller 180 of the DMC 1 100-1 determines whether the selected DMR 1 200-1 is available for the playback of the selected content with reference to the received job schedule information [S700].

For instance, if the DMR 1 200 is not performing a different job, the controller 180 of the DMC 1 100-1 is able to determine that the DMR 1 200-1 is available.

If the DMR 1 200-1 is not performing a different job and if there is a spare time amounting to a total play time of the selected multimedia content on the job schedule (i.e., if there is not job reservation from a current hour to a total play time of the multimedia content), the controller 180 of the DMC 1 100-1 is able to determine that the DMR 1 200-1 is available.

If the DMR 1 200 is determined as available, the DMC 1 100-1 is able to control the DMS 300 and the DMR 1 200-1 to enable the DMS 300 to transmit the selected content to the DMR 1 200-1 [S800].

Subsequently, the DMS 300 is able to transmit the selected content to the DRM 1 200-1 [S900].

And, the DMC 1 100-1 is able to control the transmitted content to be played by the DMR 1 200-1 [S1000]. Referring to FIG. 5 (5-3), the controller 180 of the DMC 1 100-1 is able to display an announcement 420 announcing that the selected content is being played by the DMR 1 on the display screen 400 of the DMC 1 100-1.

Meanwhile, if the DMR 1 200-1 is determined as not available since the DMR 1 200-1 is already playing a different multimedia content [FIG. 6 (6-1), the controller 180 of the DMC 1 100-1 gives up the playback of the selected content and is then able to control an announcement 430, which announces that the selected content is not playable by the DMR 1, to be displayed on the display screen 400 of the DMC 1 100-1 [FIG. 5 (5-4)] [S1100]. And, referring to FIG. 6 (6-2), the controller 180 of the DMC 1 100-1 is able to display an announcement 510, which announces that the content play request was received and rejected, to be displayed on the display screen 500 of the DMR 1.

The DMR 1 may be currently unavailable for example due to playing of the different multimedia content. In this case, when a play back of the different multimedia content is completed by the DMR 1 or since a prescribed time before completion of the play back, the DMR 1 transmits an indication of the completion of the play back to the DMC 1 to inform the DMC 1 of the availability of the DMR 1 [not shown in the drawings].

According to the above description, if the DMR 1 200-1 is determined as unavailable in accordance with the job schedule, the DMC 1 100-1 directly abandons to play the selected content by the DMR 1, by which the present embodiment is non-limited. For instance, even though the DMR 1 200-1 is determined as unavailable in accordance with the job schedule, the DMC 1 100-1 forces the selected content to be played by the DMR 1 200-1 or is able to make a reservation for the playback of the selected content. This is explained in detail with reference to FIG. 7 and FIG. 8 as follows.

Figure 7:
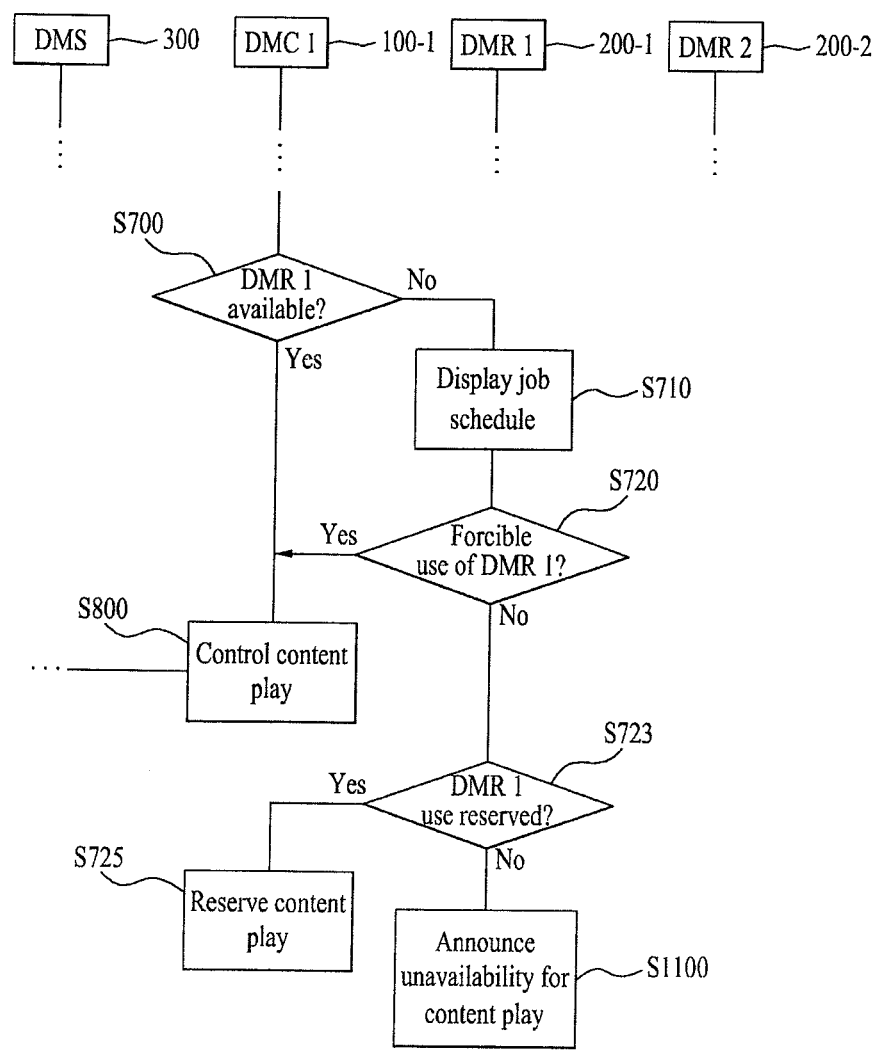
FIG. 7 is a flowchart for implementing an embodiment according to an embodiment of the present invention.

FIG. 7 is a flowchart for implementing an embodiment according to the present invention. And, FIG. 8 is a diagram of display screen configuration of a display unit of a DMC according to an embodiment of the present invention.

First of all, since the step S700 and the steps followed by the step S700 in FIG. 7 are substantially identical to those steps described with reference to FIG. 5, they shall not be explained in the following description for clarity of this disclosure.

Figure 8:
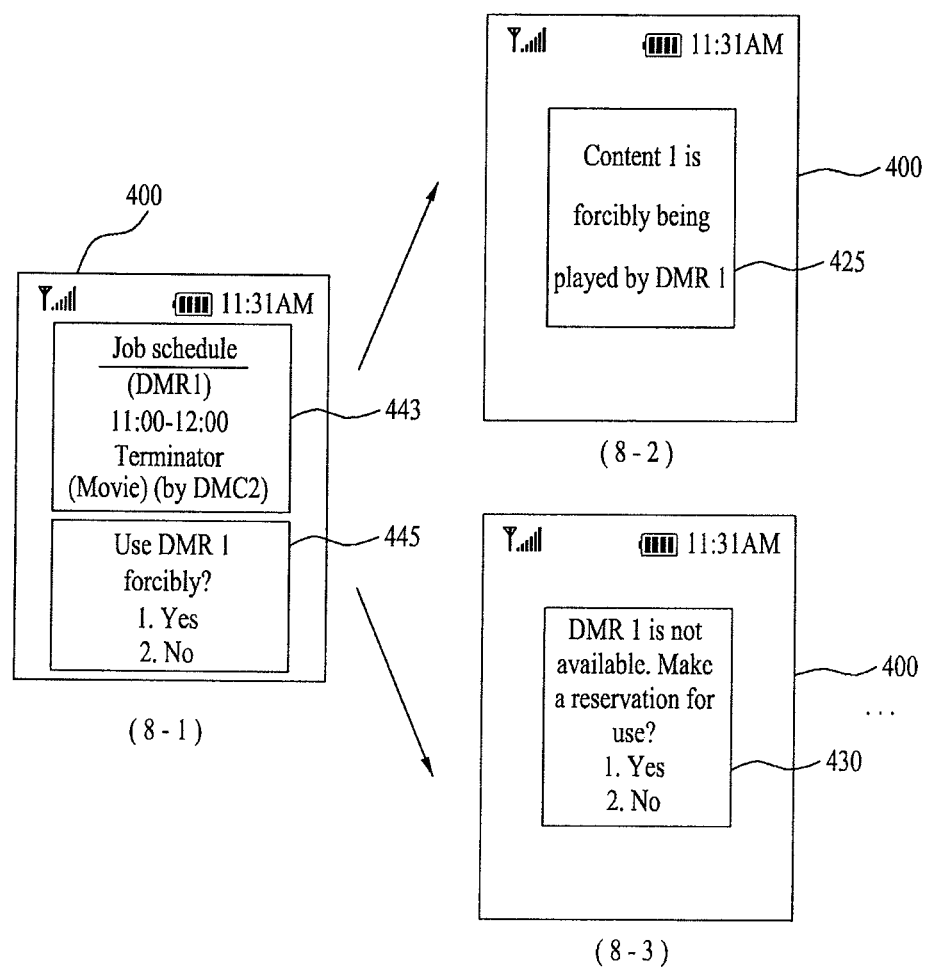
FIG. 8 is a diagram of display screen configuration of a display unit of a DMC according to an embodiment of the present invention.

Referring to FIG. 7 and FIG. 8, if the DMR 1 200-1 is determined as available, as mentioned in the foregoing description, the DMC 1 100-1 is able to control the DMS 300 and the DMR 1 200-1 to enable the DMS 300 to transmit the selected content to the DMR 1 200-1 [S800]. Since the steps of playing the selected content by the DMR 1 200-1 are substantially identical to those steps described with reference to FIG. 5, they shall not be explained in the following description for clarity of this disclosure.

On the contrary, if the DMR 1 200-1 is determined as unavailable since the DMR 1 200-1 is already playing a different multimedia content for example, referring to FIG. 8 (8-1), the controller 180 of the DMC 1 100-1 is able to control the display screen 400 of the DMC 1 100-1 to display at least one portion 443 of the job schedule of the DMR 1 200-1 [S710]. On the displayed job schedule, at least one of information ("Terminator (movie)") of the currently played different multimedia content, entity information ("DMC 2") on an entity controlling the playback of the different multimedia content, and estimated play time information ("11:00-12:00") can be displayed.

Subsequently, referring to FIG. 8 (8-1), the controller 180 of the DMC 1 100-1 is able to control the display screen 400 of the DMC 1 100-1 to display a window 445 for querying whether to forcibly use the DMR 1 200-1 [S720].

A user is able to input a user command regarding wither to forcibly use the DMR 1 200-1 via the window 445. In this case, the user command can be inputted in a manner of touching a corresponding option on the window 445 or performing an appropriate manipulation on the user input unit 130.

Optionally, since the step S710 of displaying the job schedule is provided only to help the user determining whether to forcibly use the corresponding DMR, it can be omitted.

If the forcible use of the DMR 1 200-1 is requested, the DMC 1 100-1 is able to control the DMS 300 and the DMR 1 200-1 to force the DMR 1 200-1 to play the selected content unconditionally irrespective of the job schedule of the DMR 1 200-1 [S800]. In particular, the DMR 1 200-1 forces the different multimedia content to stop being played and then starts to play the selected content, under the control of the DMC 1 100-1. referring to FIG. 8 (8-2), the controller 180 of the DMC 1 100-1 is able to display an announcement 425 announcing that the DMR 1 is being forced to play the selected content on the display screen 400 of the DMC 1 100-1.

On the contrary, if the forcible use of the DMR 1 200-1 is not requested, referring to FIG. 8 (8-3), the controller 180 of the DMC 1 100-1 is able to display a window 450, which queries whether to make a reservation for the use of the DMR 1 200-1 for the playback of the selected content on the display screen 400 of the DMC 1 100-1 [S723].

A user is able to input a user command for making the reservation for the use of the DMR 1 200-1 via the window 450. In this case, it is able to input the user command in a manner of touching a corresponding option displayed on the window 450 or performing an appropriate manipulation on the user input unit 130.

If the reservation for the use of the DMR 1 200-1 is requested, the controller 180 of the DMC 1 100-1 is able to enter a procedure for making a reservation for the playback of the selected content in the DMR 1 200-1 [S725]. Since the reservation for playing a prescribed multimedia content in the display device 200 is apparent to those skilled in the art, its details shall be omitted from the following description for clarity of this disclosure.

On the contrary, if the reservation for the use of the DMR 1 200-1 is not requested, referring to FIG. 8 (8-2), the controller 180 of the DMC 1 100-1 gives up the playback of the selected content and is able to display an announcement 430, which announces that the selected content is not playable by the DMR 1 on the display screen 400 of the DMC 1 100-1 [S1100].

According to the above description, although the DMR 1 200-1 is already playing a different multimedia content, the DMC 1 100-1 forces the DMR 200-1 to stop playing the different multimedia content and controls the selected content to be played instead, by which the present embodiment is non-limited. For instance, the DMC 100-1 inquires an entity for controlling to play the different multimedia content of whether it is possible (or okay) to stop the play of the different multimedia content. If it is possible to stop the play of the different multimedia content, the DMC 1 100-1 is able to control the selected content to be played by the DMR 1 200-1. This is explained in detail with reference to FIG. 9 as follows.

First of all, the entity for controlling the play of the different multimedia content can be the DMR 1 200-1 (for example, in case that the DMR1 200-1 controls itself to reproduce a TV broadcast), or the DMC 2 100-2 different from the DMC 1 100-1. The following description shall be made on the assumption that the entity for controlling the play of the different multimedia content is the DMC 2 100-2.

Figure 9:
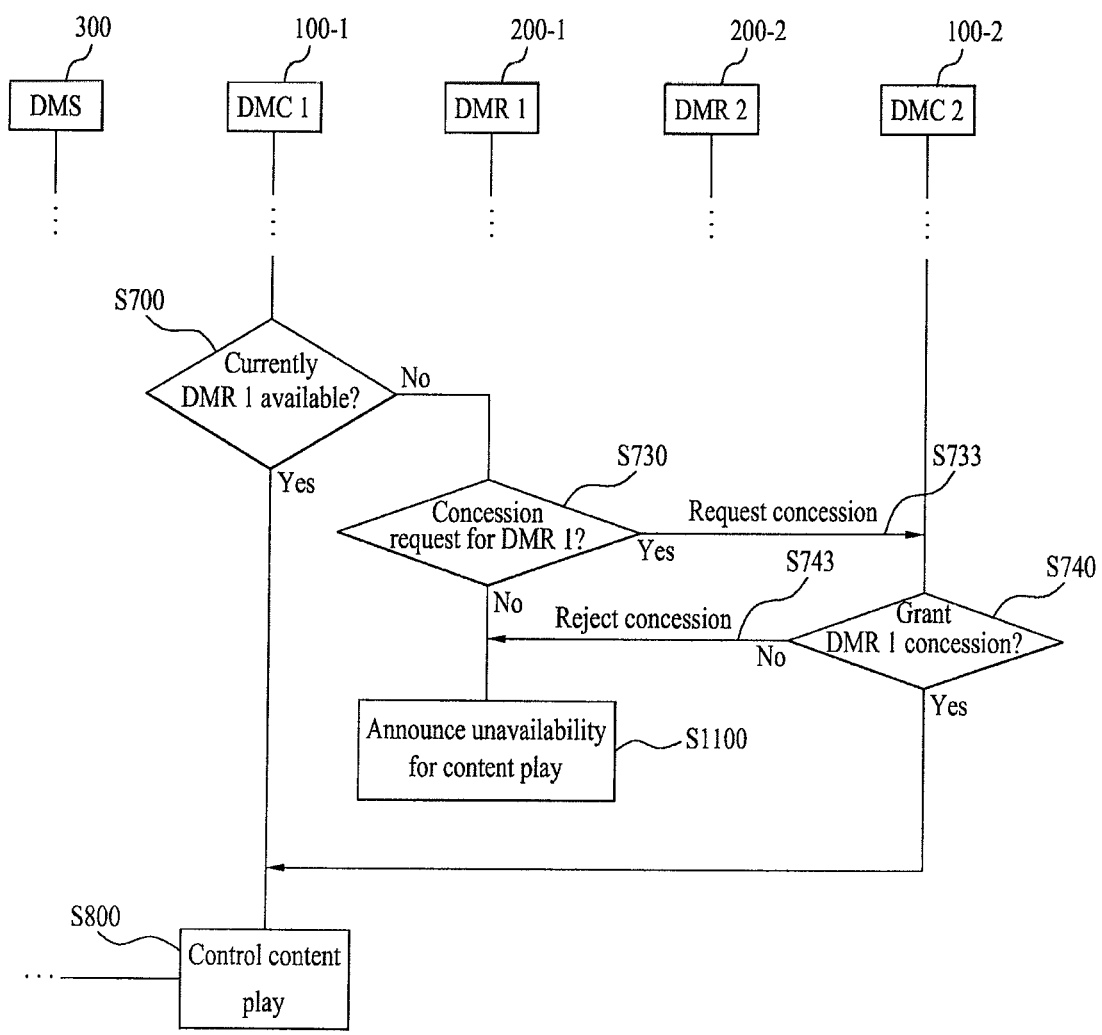
FIG. 9 is a flowchart for implementing an embodiment according to an embodiment of the present invention.

FIG. 9 is a flowchart for implementing an embodiment according to the present invention.

First of all, since the step S700 and the steps followed by the step S700 in FIG. 9 are identical to those steps described with reference to FIG. 5, they shall not be explained in the following description for clarity of this disclosure.

Referring to FIG. 9, if the DMR 1 200-1 is determined as available, as mentioned in the foregoing description, the DMC 1 100-1 is able to control the DMS 300 and the DMR 1 200-1 to enable the DMS 300 to transmit the selected content to the DMR 1 200-1 [S800]. Since the steps of playing the selected content by the DMR 1 200-1 are identical to those steps described with reference to FIG. 5, they shall not be explained in the following description for clarity of this disclosure.

On the contrary, if the DMR 1 200-1 is determined as unavailable since the DMR 1 200-1 is already playing a different multimedia content for example, the controller 180 of the DMC 1 100-1 is able to transmit a concession request message, which requests a concession of a use of the DMR 1 200-1, to the DMC 2 100-2 to inquire the DMC 2 100-2 of whether the play of the different multimedia content can be stopped [S733]. When the DMR 1 100-1 is determined as unavailable, the concession request message can be transmitted by the DMC 1 100-1 automatically or in accordance with a user command given by a user.

The DMC 1 100-1 is able to transmit the concession request message to the DMC 2 100-2 via the DMR 1 200-1. Alternatively, the DMC 1 100-1 receives information on the entity for controlling the DMR 1 200-1, i.e., information on the DMC 2 100-2, from the DMR 1 200-1, and is then able to directly transmit the concession request message to the DMC 2 100-2.

In response to the concession request message, the DMC 2 100-2 determines whether to grant the concession request [S740].

As a result of the determination S740, if the DMC 2 100-2 does not grant the concession request, the DMC 2 100-2 is able to transmit a concession reject message to the DMC 1 100-1 [S743]. In this case, the concession reject message is directly transmitted to the DMC 1 100-1 or can be transmitted to the DMC 1 100-1 via the CMR 1 200-1.

If so, in response to the concession reject message, the DMC 1 100-1 abandons the play of the selected content and is able to display an announcement 430, which announces that the selected content is not playable by the DMR 1 200-1 on the display screen 400 of the DMC 1 100-1 [S1100].

On the contrary, as a result of the determination S740, if the DMC 2 100-2 grants the concession request, the DMC 2 100-2 is able to transmit a concession grant message to the DMC 1 100-1 [S745]. In this case, like the concession reject message, the concession grant message is directly transmitted to the DMC 1 100-1 or can be transmitted to the DMC 1 100-1 via the DMR 1 200-1.

If so, in response to the concession grant message, the DMC 1 100-1 is able to control the DMS 300 and the DMR 1 200-1 to enable the DMS 300 to transmit the selected content to the DMR 1 200-1 [S800]. Thereafter, since the steps of playing the selected content by the DMR 1 200-1 are identical to those parts described with reference to FIG. 5, their details shall be omitted from the following description for clarity.

According to the above embodiment, if the play of the selected content by the DMR 1 200-1 is not allowed, the play of the selected content is abandoned, by which the present embodiment is non-limited. For instance, if the play of the selected content by the DMR 1 200-1 is not allowed, the CMD 1 100-1 is able to control another DMR to play the selected content. This is explained in detail with reference to FIG. 10 and FIG. 11 as follows.

Figure 10:
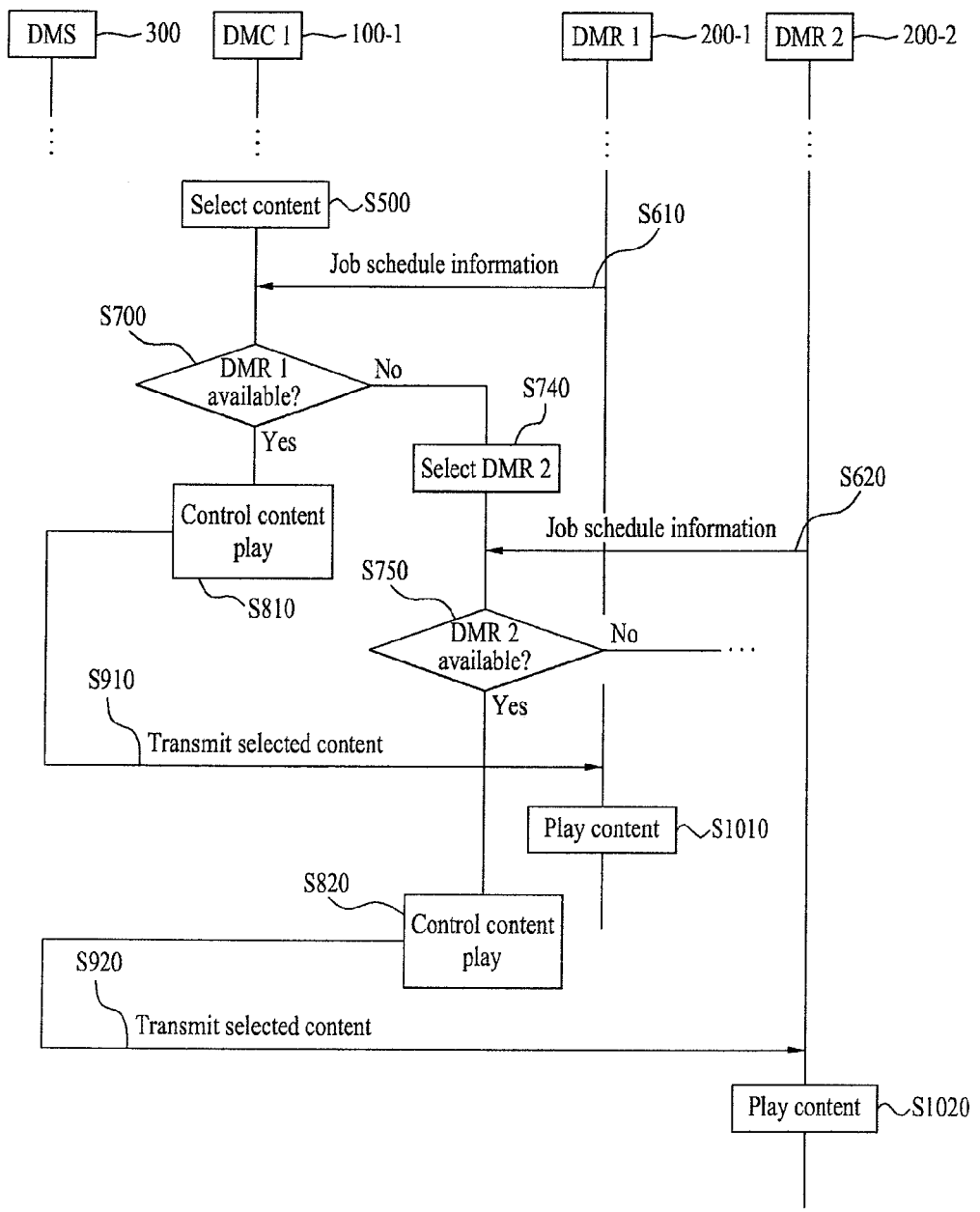
FIG. 10 is a flowchart for implementing an embodiment according to an embodiment of the present invention.

FIG. 10 is a flowchart for implementing an embodiment according to the present invention. And, FIG. 11 is a diagram of display screen configuration of a display unit of a DMC according to an embodiment of the present invention.

First of all, since the step S500 and its preceding steps FIG. 10 are substantially identical to those steps described with reference to FIG. 5, they shall not be explained in the following description for clarity of this disclosure.

Figure 11:
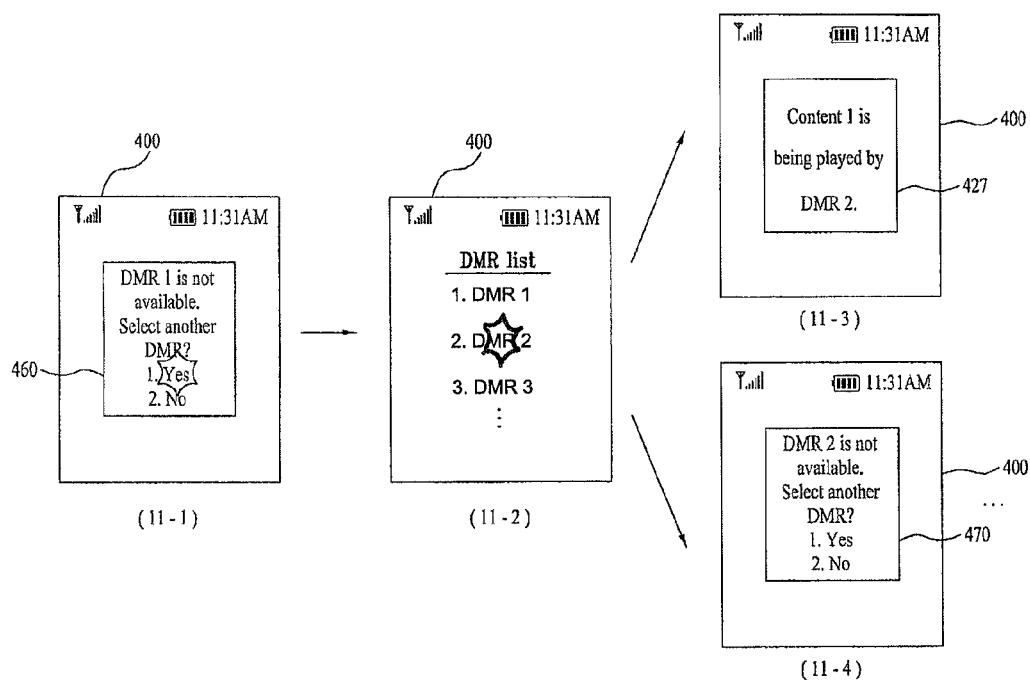
FIG. 11 is a diagram of display screen configuration of a display unit of a DMC according to an embodiment of the present invention.

Referring to FIG. 10 and FIG. 11, the DMC 1 100-1 is able to receive a corresponding job schedule information from the DMR 1 200-1 [S610].

Optionally, the step S610 of receiving the job schedule information can be performed before the step S500 of the content selection.

The controller 180 of the DMC 1 100-1 is able to determine whether the DMR 1 200-1 is available for the play of the selected content with reference to the received job schedule information [S700].

As a result of the determination S700, if the DMR 1 200-1 is determined as available, the DMC 1 100-1 is able to control the DMS 300 and the DMR 1 200-1 to enable to DMS 300 to transmit the selected content to the DMR 1 200-1 [S810].

Accordingly, the DMS 300 is able to transmit the selected content to the DMR 1 200-1 [S910].

And, the DMC 1 100-1 is able to control the transmitted content to be played by the DMR 1 200-1 [S1010].

On the contrary, if the DMR 1 200-1 is determined as unavailable, referring to FIG. 11 (11-1), the controller 180 of the DMC 1 100-1 is able to control the display screen 400 of the DMC 1 100-1 to display a window 460 for querying whether to use a different DMR instead of the DMR 1 200-1.

A user is then able to input a user command for instructing whether to use a different DMR via the window 460.

If the user does not desire to use a different DMR, the play of the selected content is abandoned [not shown in detail in FIG. 10 and FIG. 11 for clarity].

On the contrary, if the user desires to use a different DMR, referring to FIG. 11 (11-2), the controller 180 of the DMC 1 100-1 is able to display the DMR list on the display screen 400 of the DMC 1 100-1. In doing so, the DMR 1 already determined as unavailable can be displayed on the DMR list in a manner of visually distinguished from other DMRs.

The user is able to select the different DMR (e.g., the DMR 2 200-2) from the DMR list [S740]. In doing so, it is able to make the selection of the DMR 2 200-2 in a manner of touching the DMR 2 200-2 on the display screen 400 of the DMC 1 100-1 on which the DMR list is displayed. Alternatively, it is able to select the DMR 2 200-2 through an appropriate manipulation on the user input unit 130 of the DMC 1 100-1.

If the DMR 2 200-2 is selected, the DMC 1 100-1 is able to receive the corresponding job schedule information from the DMR 2 200-2 [S620].

The controller 180 of the DMC 1 100-1 determines whether the DMR 2 200-2 is available for the play of the selected content with reference to the received corresponding job schedule information [S750].

As a result of the determination S750, if the DMR 2 200-2 is determined as available, the DMC 1 100-1 controls the DMS 300 and the DMR 2 200-2 to enable the DMS 300 to transmit the selected content to the DMR 2 200-2 [S820].

Accordingly, the DMS 300 is able to transmit the selected content to the DMR 2 200-2 [S920].

And, the DMC 1 100-1 is able to control the transmitted content to be played by the DMR 2 200-2 [S1020]. Referring to FIG. 11 (11-3), the controller 180 of the DMC 1 100-1 is able to control the display screen 400 of the DMC 1 100-1 to display an announcement 427 announcing that the selected content is being played by the DMR 2 200-2.

On the contrary, as a result of the determination S750, if the DMR 2 200-2 is also determined as unavailable, referring to FIG. 11 (11-4), the controller 180 of the DMC 1 100-1 is able to control the display screen 400 of the DMC 1 100-1 to display a window 470 for querying whether to use a different DMR instead of the DMR 1 200-1 or the DMC 2 200-2.

If so, a user is able to select whether to use a different DMR in accordance of a decision of his own. Since the steps following the above step are the repetition of the step S740 and the step S750, their details shall be omitted for clarity of the following description.

According to the above embodiment, if a use of one DMR is not allowed to play the selected content, a different DMR is selected to play the selected content, by which the present embodiment is non-limited. For instance, when the DMR list is displayed in order to select a prescribed DMR from a plurality of DMRs, only DMR(s) allowable to play the selected content can be displayed on the DMR list. This is explained in detail with reference to FIG. 12 and FIG. 13 as follows.

Figure 12:
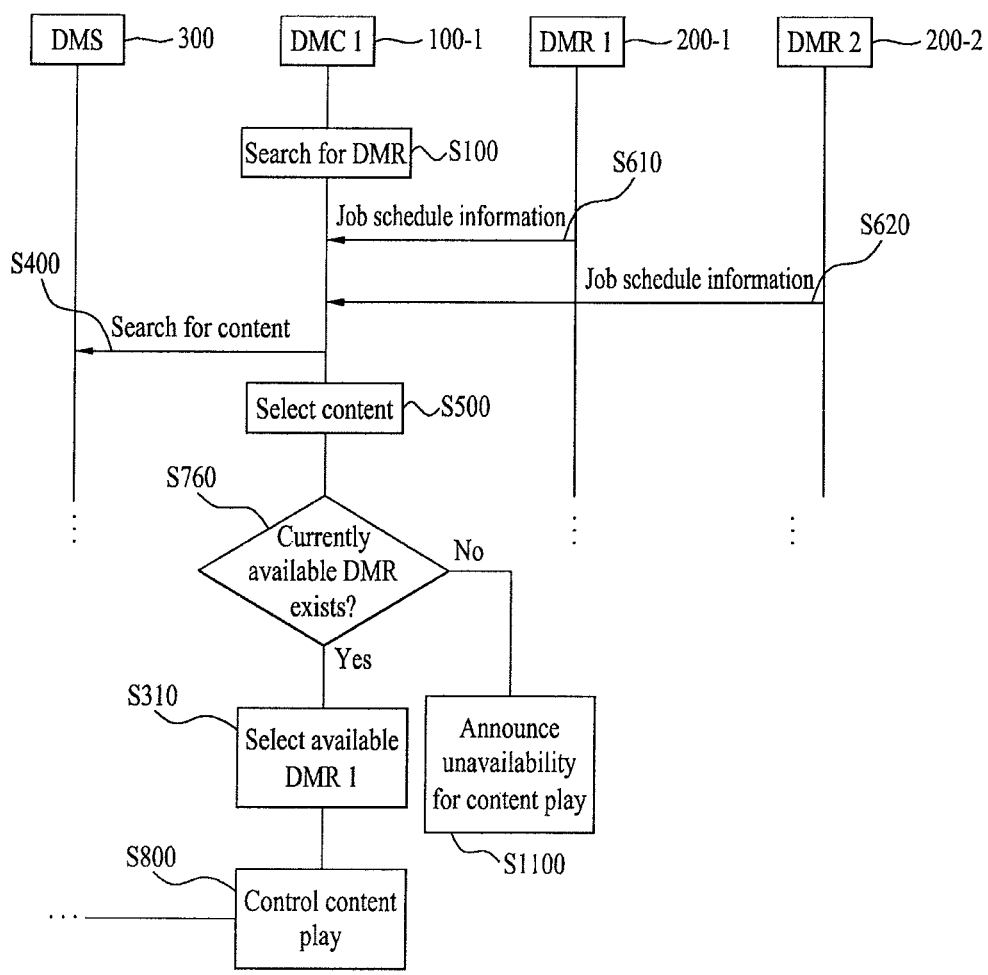
FIG. 12 is a flowchart for implementing an embodiment according to an embodiment of the present invention.

FIG. 12 is a flowchart for implementing an embodiment according to the present invention. And, FIG. 13 is a diagram of display screen configuration of a display unit of a DMC1 according to an embodiment of the present invention.

Figure 13:
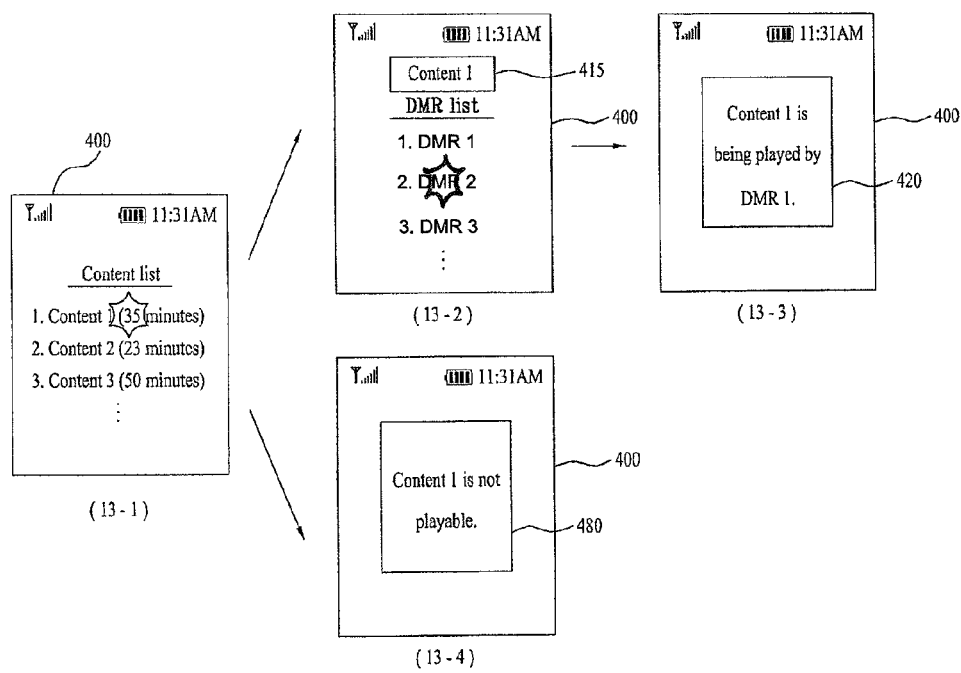
FIG. 13 is a diagram of display screen configuration of a display unit of a DMC 1 according to an embodiment of the present invention.

Referring to FIG. 12 and FIG. 13, the DMC 1 100-1 is able to search for DMRs (i.e., DMR 1, DMR 2, . . . ) within the home network [S100].

Subsequently, the DMC 1 100-1 is able to receive the corresponding job schedule information from each of the found DMRs [S610, S620].

The DMC 1 100-1 may access the DMS 300 and is then able to search for multimedia contents that can be provided by the accessed DMS 300 [S400].

The controller 180 of the DMC 1 100-1, referring to FIG. 12 (12-1), is able to display a content list of the found multimedia contents.

A user is able to select a prescribed multimedia content (e.g., the content 1) from the content list [S500]. In particular, it is able to perform the selection of the content 1 in a manner of touching the content 1 on the display screen 400 of the DMC 1 100-1 on which the content list is displayed. Alternatively, it is a matter of course that it is able to select the content 1 in a manner of performing an appropriate manipulation on the user input unit 130 of the DMC 1 100-1.

If so, the controller 180 of the DMC 1 100-1 is able to determine whether a DMR capable of playing the selected content 1 exists with reference to the corresponding job schedules received from the found DMRs [S760].

As a result of the determination S760, if it is determined that the DMR capable of playing the selected content 1 exists, referring to FIG. 13 (13-2), the controller 180 of the DMC 1 100-1 is able to display a DMR list on which DMRs (e.g., DMR 1, DMR 3) capable of playing the selected content are visually distinguished. Alternatively, it is a matter of course that only DMRs capable of playing the selected content are displayed on the DMR list.

When the DMR list is displayed, referring to FIG. 13 (13-2), the controller 180 of the DMC 1 100-1 is able to display an indicator 415 indicating that the content 1 has been selected, together with the DMR list.

A user is able to select a prescribed DMR (e.g., DMR 1 200-1) from the DMR list [S310].

The DMC 1 100-1 is able to control the DMS 300 and the DMR 1 200-1 to enable the DMS 300 to transmit the selected content to the DMR 1 200-1 [S800].

Thereafter, since the steps of playing the selected content by the DMR 1 200-1 are identical to those steps described with reference to FIG. 5, they shall not be explained in the following description for clarity of this disclosure. As mentioned in the foregoing description, referring to FIG. 13 (13-3), the controller 180 of the DMC 1 100-1 is able to control the display screen 400 of the DMC 1 100-1 to display an announcement 420 announcing that the selected content is being played by the DMR 1.

On the contrary, as a result of the determination S760, if it is determined that the DMR capable of playing the selected content 1 does not exist, referring to FIG. 13 (13-4) the DMC 1 100-1 abandons the playback of the selected content and is able to control the display screen 400 of the DMC 1 100-1 to display an announcement 480 announcing that the selected content is not playable [S1100].

According to the above embodiment, the DMC determines whether the selected content is playable by the DMR and then controls the playback of the selected content in accordance with the result of the determination, by which the present embodiment is non-limited. For instance, when a desired content and a desired DMR for the desired content are selected by the DMC, it is determined whether the DMR is able to play the desired content. And, the play of the desired content can be controlled in accordance with a result of the determination. This is explained in detail with reference to FIG. 14 and FIG. 15 as follows.

Figure 14:
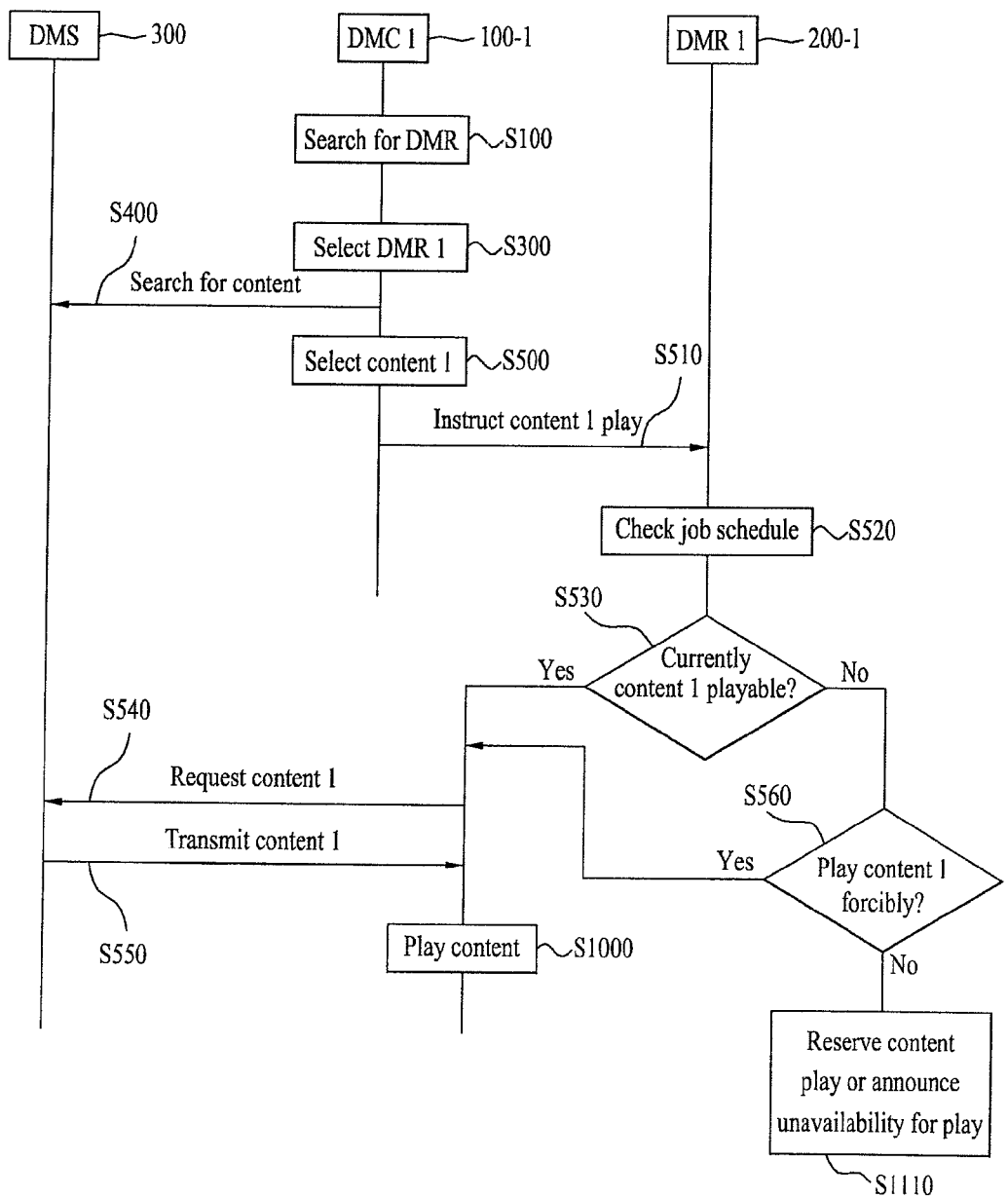
FIG. 14 is a flowchart for implementing an embodiment according to an embodiment of the present invention.

FIG. 14 is a flowchart for implementing an embodiment according to the present invention. And, FIG. 15 is a diagram of display screen configuration of a display unit of a DMR1 according to an embodiment of the present invention.

Figure 15:
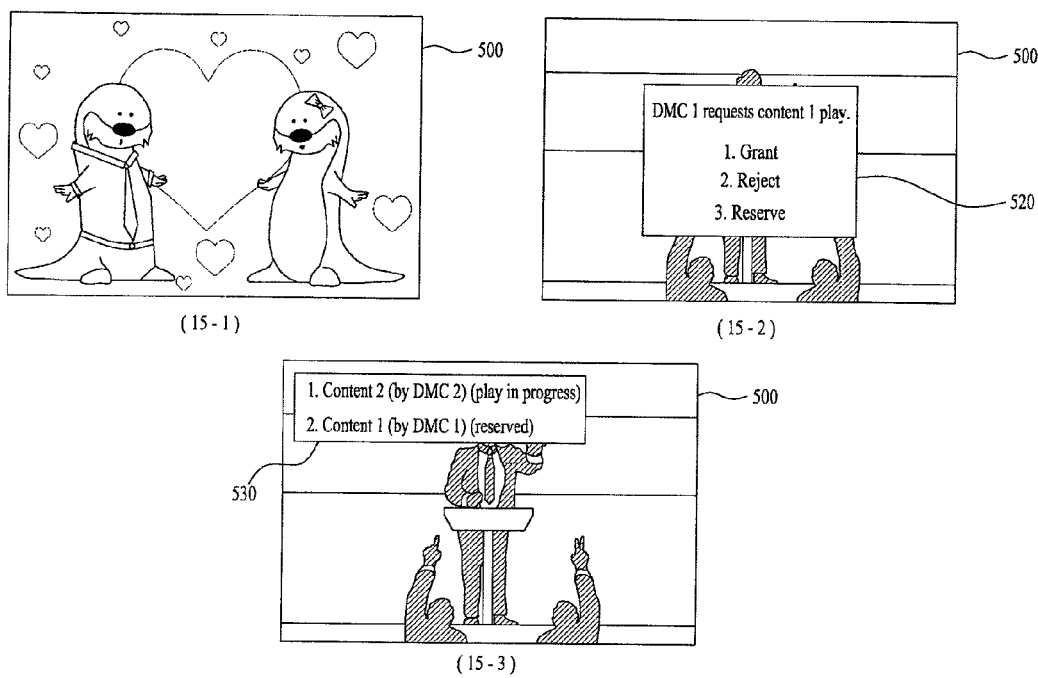
FIG. 15 is a diagram of display screen configuration of a display unit of a DMR 1 according to an embodiment of the present invention.

Referring to FIG. 14 and FIG. 15, the DMC 1 100-1 is able to search for DMRs (i.e., DMR 1, DMR 2, . . . ) within the home network [S100].

The controller 180 of the DMC 1 100-1 is able to display a DMR list of the found DMRs.

A user is able to select a prescribed DMR (e.g., DMR 1 200-1) from the DMR list [S300].

If the DMR 1 200-1 is selected from the DMR list, the controller 180 of the DMC 1 100-1 accesses the DMS 300 and is then able to search for multimedia contents that can be provided by the accessed DMS 300 [S400].

The controller 180 of the DMC 1 100-1, referring to FIG. 5 (5-2), is able to display a content list of the found multimedia contents.

A user is able to select a desired multimedia content (e.g., content 1) from the content list [S500].

If so, the DMC 1 100-1 accesses the selected DMR 1 200-1 and is then able to deliver a control signal for enabling the selected content to be played thereto [S520].

The controller 280 of the DMR 1 200-1 is then able to determine whether the selected content is playable with reference to the job schedule of the DMR 1 200-1 [S530].

As a result of the determination S530, if the selected content is determined as playable, the DMR 1 200-1 is able to make a request for the selected content to the DMS 300 [S540]. In particular, the request for the selected content can be transmitted to the DMS 300 via the DMC 1 100-1 or can be directly transmitted to the DMS 300.

Subsequently, the DMR 1 200-1 is able to receive the selected content from the DMS 300 [S550].

The controller 280 of the DMR 1 200-1, referring to FIG. 15 (15-1) is able to control the received content to be played on the display screen 500 of the DMR 1 200-1 [S1000].

On the contrary, as a result of the determination S530, since the DMR 1 200-1 is already playing a different multimedia content for example, if the selected content is determined as unplayable, referring to FIG. 15 (15-2), the controller 280 of the DMR 1 200-1 is able to control the display screen 500 of the DMR 1 200-1 to display a window 520 for announcing that the play request for the selected content has been made by the DMC 1 and for querying a method of processing the play request [S560].

If so, a user is able to input a user command for the method of processing the play request for the selected content via the window 520. In particular, the user command is inputted by touching a corresponding option on the window 520 or by performing an appropriate manipulation on the user input unit 230 in the DMR 1 200-1.

For instance, in response to the play request for the selected content, the user may stop playing the different multimedia content and is able to input a user command for forcing the selected content to be played. In case of forcing the selected content to be played, after a concession request for stopping the play of the different multimedia content has been made to a control device for controlling the play of the different multimedia content, it is able to determine whether to forcibly play in accordance with the corresponding result. The concession request is already explained in the foregoing description and its details shall be omitted from the following description.

In accordance with the procedures described in the aforesaid steps S540, S550 and S1000, the controller 180 of the DMC 1 100-1 is able to play the selected content.

Alternatively, in response to the play request for the selected content, the user is able to input a user command for rejecting the play of the selected content or a user command for reserving the play of the selected content [S1110].

If the user command for rejecting the play of the selected content is inputted, an announcement (not shown in the drawing), which announces that the play of the selected content has been rejects, can be displayed on the display screen 500 of the DMR 1 200-1 or the display screen 400 of the DMC 1 100-1 [not shown in the drawing].

If the user command for reserving the play of the selected content is inputted, it is able to control the DMR 1 200-1 to enter a procedure for reserving the play of the selected content.

If the play of the selected content (e.g., content 1) is reserved, referring to FIG. 15 (15-3), the controller 180 of the DMC 1 100-1 is able to control the display screen 500 of the DMR 1 200-1 to display an announcement 530 announcing that the play of the selected content has been reserved.

Even if the play of the selected content is reserved, the user may stop playing the different multimedia content at anytime via the user input unit 230 of the DMR 1 200-1 and is able to command an initiation of the reserved play of the content.

Accordingly, the present invention provides the following effects and/or advantages.

First of all, according to at least one of embodiments of the present invention, when the mobile terminal (DMC) gives a command for a desired multimedia content to be played by the display device (DMR) in the home network service, if the display device is already playing a different multimedia content, the play command for the desired multimedia content can be processed in further consideration of user's convenience.

In particular, in case that the display device is already playing the different multimedia content, although the mobile terminal (DMC) gives the command for the display device (DMR) to play the desired multimedia content, it is advantageous in that the play of the different multimedia content can be prevented from being stopped instantly irrespective of user's intention.

As mentioned in the foregoing description, the present invention is applicable to such a mobile terminal as a mobile phone, a smart phone, a digital broadcast terminal, a PDA (personal digital assistants), a PMP (portable multimedia player), a navigation system and the like and such a display device as a notebook computer (laptop), a tablet computer, a desktop computer, a television set (e.g., a digital TV set, a smart TV set, etc.) and the like.

It will be apparent to those skilled in the art that various modifications and variations can be specified into other form(s) without departing from the spirit or scope of the inventions.

For instance, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like. And, the computer can include the controller 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
a user input unit;
a display unit;
a wireless communication unit; and
a controller operatively connected to the user input unit, the display unit and the wireless communication unit, the controller operable to search for one or more multimedia contents and then control one of any found multimedia contents to be selected via the user input unit,
search for one or more external display devices via the wireless communication unit and then control a first display device to be selected from any found external display devices via the user input unit,
determine whether the selected multimedia content is to be played by the first display device in accordance with an ongoing or reserved job schedule of the first display device, and
if the first display device is already controlled to play a different multimedia content by a different control device, display a graphic interface for performing a forcible play of the selected multimedia content on the first display device, wherein the graphic interface for performing the forcible play is displayed together with information of the different multimedia content and the different control device.

2. The mobile terminal of claim 1, further comprising:
a memory unit operatively connected to the controller and operable to store the selected multimedia content,
wherein the controller is operable to control the selected multimedia content to be delivered to the first display device from the memory unit.

3. The mobile terminal of claim 1, wherein the controller is operable to
access a server via the wireless communication unit, and
control the server to be searched for the one or more multimedia contents.

4. The mobile terminal of claim 3, wherein the controller is operable to control the selected multimedia content to be directly transmitted to the first display device from the server without passing through the mobile terminal.

5. The mobile terminal of claim 1, wherein, when the first display device is selected, the controller is operable to receive the ongoing or reserved job schedule information from the first display device, and
check whether the first display device is currently available to play the selected multimedia content.

6. The mobile terminal of claim 5, wherein, if the first display device is available, the controller is operable to control the selected multimedia content to be provided to and played by the first display device.

7. The mobile terminal of claim 5, wherein, if the first display device is not available, the controller is further operable to control an output of an announcement announcing that the selected multimedia content is not currently playable by the first display device.

8. The mobile terminal of claim 7, wherein, if the first display device is not available, the controller is further operable to control a second display device among the one or more external display devices to be selected for playing the selected multimedia content instead of the first display device.

9. The mobile terminal of claim 5, wherein, if the first display device is not currently doing a different job, the controller is operable to determine that the first display device is available.

10. The mobile terminal of claim 5, wherein, if the first display device currently has a spare time amounting to a total play time of the selected multimedia content on the ongoing or reserved job schedule, the controller is operable to determine that the first display device is available.

11. The mobile terminal of claim 5, wherein the controller is operable to control any found display devices to be displayed on the display unit and then control one of the displayed display devices to be selected by a user.

12. The mobile terminal of claim 11, wherein the controller is operable to
receive corresponding job schedule information from each of the found display devices, and
control any found display device that is currently available for the play of the selected multimedia content to be displayed by being visually distinguished.

13. The mobile terminal of claim 1, wherein, if the first display device is not available, the controller is further operable to query the different control device about the possibility of stopping the play of the different multimedia content before performing the forcible play of the selected multimedia content on the first display device.

14. A display device comprising:
a display unit;
an interface unit; and
a controller operatively connected to the display unit and the interface unit, the controller operable to:
receive multimedia contents selected by one or more control devices via the interface unit,
display the received multimedia contents on the display unit,
upon receiving a control command for playing a specific multimedia content from a first control device among the one or more control devices via the interface unit, determine whether to play the specific multimedia content in accordance with an ongoing or reserved job schedule, and
if the display device is already controlled to play a different multi-media content by a different control device, transmit information of the different multimedia content and the different control device to the first control device, wherein the information of the different multimedia content and the different control device is to be displayed by the first control device together with a graphic interface for performing a forcible play of the specific multimedia content on the display device.

15. The display device of claim 14, wherein the controller is operable to
receive the specific multimedia content from the first control device, and
display the received multimedia content.

16. The display device of claim 14, wherein the controller is operable to control to directly receive the specific multimedia content from a server designated by the first control device without passing through the first control device.

17. The display device of claim 14, wherein the controller is operable to control to check whether a play of the specific multimedia content can be performed with reference to the ongoing or reserved job schedule information.

18. The display device of claim 17, wherein, if the play of the specific multimedia content can be performed, the controller is operable to control the specific multimedia content to be received and played.

19. The display device of claim 17, wherein, if the play of the specific multimedia content cannot be performed, the controller is further operable to transmit an announcement to the first control device announcing that the play of the specific multimedia content cannot be performed.

20. The display device of claim 17, wherein, if a different job is not currently in progress, the controller is operable to determine that the play of the specific multimedia content can be performed.

21. The display device of claim 17, wherein, if a spare time amounting to a total play time of the specific multimedia content exists on the ongoing or reserved job schedule, the controller is operable to determine that the play of the specific multimedia content can be performed.

22. A method of controlling a mobile terminal, comprising:
searching for one or more multimedia contents by a controller of the mobile terminal;
selecting one of any found multimedia contents via a user input unit of the mobile terminal;
searching for one or more external display devices via a wireless communication unit of the mobile terminal;
selecting a first display device from any found external display devices via the user input unit; determining by the controller whether the selected multimedia content is to be played by the first display device in accordance with an ongoing or reserved job schedule of the first display device; and
if the first display device is already controlled to play a different multimedia content by a different control device, displaying a graphic interface for performing a forcible play of the selected multimedia content on the first display device, wherein the graphic interface for performing the forcible play is displayed together with information of the different multimedia content and the different control device.

23. A method of controlling a display device, comprising:
receiving multimedia contents selected by one or more control devices via an interface unit of the display device;
displaying the received multimedia contents on a display unit of the display device; upon receiving a control command for playing a specific multimedia content from a first control device among the one or more control devices via the interface unit, determining by a controller of the display device whether to play the specific multimedia content in accordance with an ongoing or reserved job schedule; and
if the display device is already controlled to play a different multimedia content by a different control device, transmitting information of the different multimedia content and the different control device to the first control device, wherein the information of the different multimedia content and the different control device is to be displayed by the first control device together with a graphic interface for performing a forcible play of the specific multimedia content on the display device.

\* \* \* \* \*